W. R. FONTAINE.
CLAMP.
APPLICATION FILED AUG. 27, 1919.
1,346,947.
Patented July 20, 1920.
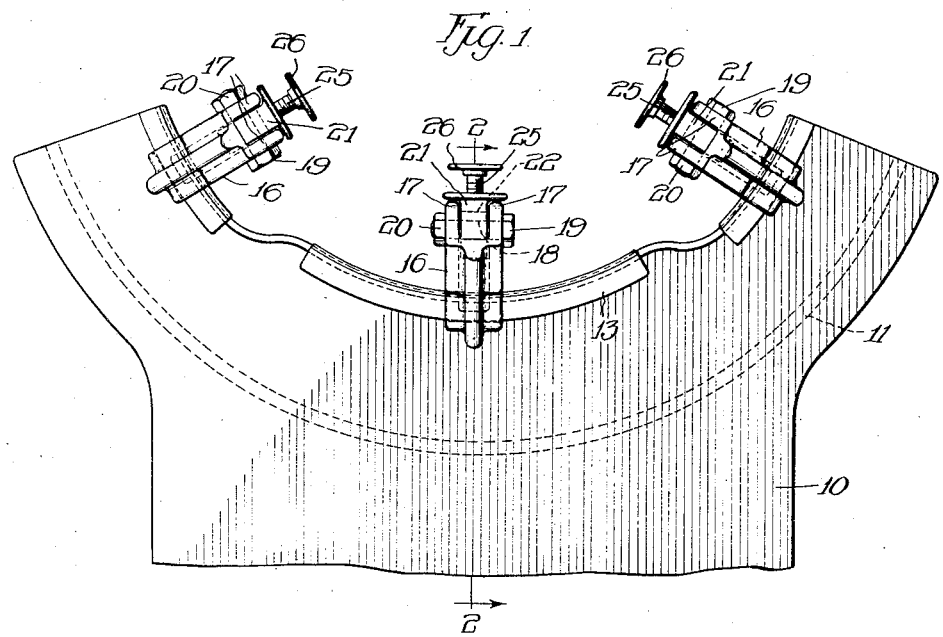
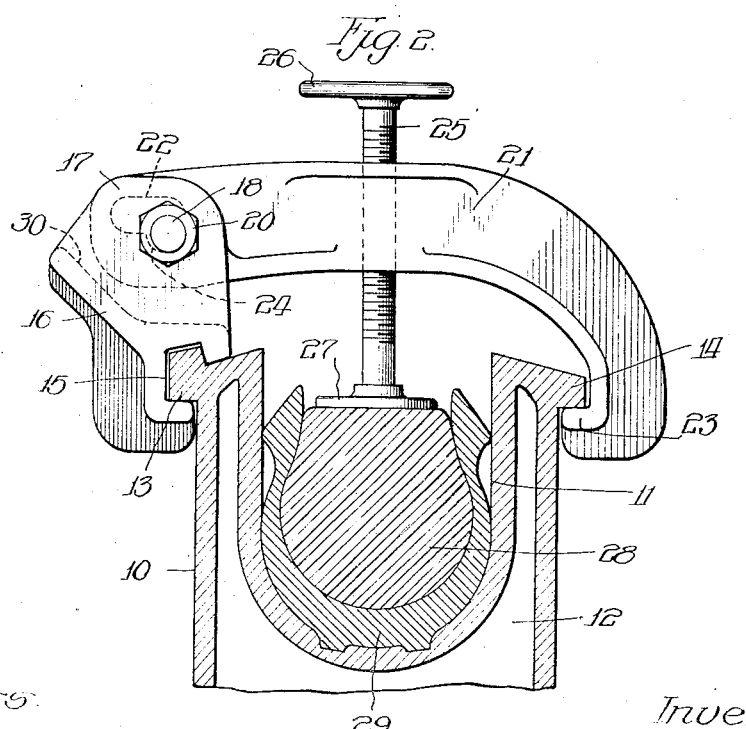
Witness
R. Burkhardt
Inventor
Walter R. Fontaine,
By Wilkinson & Huxley
Attys

UNITED STATES PATENT OFFICE.

WALTER R. FONTAINE, OF CHICAGO, ILLINOIS, ASSIGNOR TO WESTERN VULCANIZER MANUFACTURING COMPANY, OF CHICAGO, ILLINOIS, A COPARTNERSHIP CONSISTING OF HERBERT K. WHEELOCK, FRANK A. WELLER, AND WALTER R. FONTAINE.

CLAMP.

1,346,947.  Specification of Letters Patent.  Patented July 20, 1920.

Application filed August 27, 1919. Serial No. 320,117.

*To all whom it may concern:*

Be it known that I, WALTER R. FONTAINE, a citizen of the United States, residing at Chicago, in the county of Cook and State of Illinois, have invented certain new and useful Improvements in Clamps, of which the following is a specification.

My invention relates to clamps and refers particularly, although not exclusively, to clamps used in connection with retreaders for tires.

In the process of retreading tire casings, it is customary to use a retreader having an arcuate vulcanizing bed which is adapted to receive a portion of the tire casing. A sand-bag or the like is ordinarily inserted within the tire casing and is firmly clamped in position, so that the tire casing is thus brought into close engagement with the vulcanizing bed.

Heretofore it has been customary to employ clamps which consist of a rigid crosspiece having a jaw at each end adapted to engage a clamping flange on each side of the retreader. A clamping screw was passed through the clamp and on tightening was adapted to be in engagement with the sandbag on the inside of the tire casing.

In order to insert the tire casing in position, it has been necessary to entirely remove from the retreader the clamps of the type just described, this removal being effected by sliding the clamps longitudinally along the retreader until the jaws of the clamps were freed from engagement with the clamping flanges of the retreader.

It is evident that by the construction of clamp which has just been described, there is considerable delay in getting the clamps into position for clamping the tire casing in place preparatory to vulcanization, and after the vulcanization is completed there is a corresponding delay in removing the clamps.

It is the object of my invention to construct a clamp which normally remains in position on the retreader, but which at the same time is adapted to be so operated that a portion of the clamp may be moved so that a tire casing can be quickly and easily applied and removed from the vulcanizing bed of the retreader. In general terms, the clamp consists of a retaining arm normally held in position on the retreader and a clamping arm pivotally connected with the retaining arm and laterally movable with respect thereto, this clamping arm carrying the clamping screw and being adapted to be swung out of clamping position so that the tire casing can be readily applied to or removed from the vulcanizing bed.

This and other advantages of my invention will be more readily understood by reference to the accompanying drawings, which show a preferred embodiment of my invention, and in which—

Figure 1 is a side elevation of a portion of a retreader showing the retreader clamps applied thereto; and Fig. 2 is a fragmentary transverse section taken on the line 2—2 of Fig. 1.

The retreader consists of a hollow casing 10 containing the arcuate concave vulcanizing bed 11. The inner surface of the wall of the vulcanizing bed forms the wall of the steam chamber 12 of the retreader according to the usual construction. On one side of the retreader, adjacent to the upper edge of the vulcanizing bed, are one or more retaining flanges 13, and on the opposite side of the retreader are one or more clamping flanges 14.

As most clearly shown in Fig. 2, the retaining flange 13 is in the form of a projection adapted to be engaged by the correspondingly shaped groove 15 of the retaining arm 16 of the clamp, so that this retaining arm is capable of longitudinal movement on the retaining flange 13, but cannot be laterally moved with respect thereto. The retaining arm 16 has a pair of upstanding brackets 17, between which extends the pivot pin 18 suitably held in position by its head 19 and the nut 20. The clamping arm 21 has therein the aperture 22, through which the pivot pin 18 extends.

As most clearly shown in Fig. 2, when the clamping arm 21 is in its normal operative position, the aperture 22 extends laterally from the pivot pin 18 for a sufficient distance to allow the jaw 23 of the clamping arm to be disengaged from the clamping flange 14 of the retreader. The aperture 22 also has a downwardly extending portion 24, the lower edge of which is brought into contact with the pivot pin 18 when the clamp is in operative position, as shown in Fig. 2.

The clamping arm 21 carries the clamping screw 25, having at its upper end the hand-wheel 26, and at its lower end the press-plate 27, preferably freely rotatable on the end of the clamping screw 25, this press-plate being adapted to engage the sand-bag 28 placed inside of a tire casing 29.

Having thus described the various parts which are used in my invention, the operation of the same may now be readily understood: When the retreader is not in operation, the clamping arm 21 of the clamp is swung to the left from the position shown in Fig. 2, this operation being possible by the left hand portion of the aperture 22 being brought into engagement with the pivot pin 18. In this open position, the upper edge of the clamping arm engages the wall 30 of the retaining arm 16. The clamp being in this open position, the tire casing and its contained sand-bag may be placed in the vulcanizing bed 11. The clamping arm 21 is then swung into position over the retreader, the left hand portion of the aperture 22 still being held in engagement with the pivot pin 18, so that the jaw 23 can pass beyond the outer edge of the clamping flange 14 of the retreader. The clamping arm is then as a whole moved to the left, so that the jaw 23 engages the clamping flange 14, as shown in Fig. 2. The clamping screw 25 is then screwed down so that the press-plate 27 is brought into engagement with the sand-bag 28, and by this operation, the left hand end of the clamping arm 21 is raised so that the lower edge of the extension 24 of the aperture 22 is brought into engagement with the pivot pin 18, thus effectually preventing any further lateral movement of the clamping arm 21. The clamping screw 25 may be turned by means of a lever attached to the hand-wheel 26, if desired, until the requisite pressure is applied to the sand-bag 28.

Before removing a tire casing from the retreader after the vulcanization has been completed, the opposite cycle of operations takes place; that is, the clamping screw 25 is first loosened until the left hand end of the clamping arm falls sufficiently to disengage the pivot pin 18 from the downward extension 24 of the aperture 22. The clamping arm is then moved to the right until the left hand end of the aperture 22 engages the pivot pin, thereby freeing the jaw 23 from engagement with the retaining flange 14; and the clamping arm 21 is then swung to the left into its open position.

It will be apparent to those skilled in the art that many changes could be made in the detailed construction of the parts which are described without departing from the spirit or scope of my invention.

I claim:

1. A clamp comprising a retaining arm adapted to engage a relatively fixed flange, a clamping arm pivotally attached to said retaining arm and bodily movable with respect thereto, said clamping arm also being adapted to engage a relatively fixed flange, and means for retaining said arms in the positions in which they engage said fixed flanges.

2. A clamp comprising a retaining arm adapted to engage a relatively fixed flange, a clamping arm pivotally attached to said retaining arm and bodily movable laterally with respect thereto, said clamping arm also being adapted to engage a relatively fixed flange, and means carried by said clamping arm for locking said arms in the positions in which they engage said flanges.

3. A clamp comprising a retaining arm adapted to engage a relatively fixed flange, a clamping arm pivotally attached to said retaining arm and bodily movable laterally with respect thereto, said clamping arm also being adapted to engage a relatively fixed flange, and a clamping screw carried by said clamping arm and adapted to lock said arms in position.

4. A clamp comprising a retaining arm adapted to engage a flange on a retreader, a clamping arm pivotally attached to said retaining arm and bodily movable laterally with respect thereto, said clamping arm having a jaw adapted to engage a second flange on said retreader, and a clamping screw carried by said clamping arm and adapted to lock said arms in position when said clamping screw is brought into engagement with an object contained in said retreader.

5. A retreader clamp comprising a retaining arm having a groove therein adapted to engage a retaining flange on a retreader to permit relative longitudinal but not relative lateral movement between said arm and said retreader flange, a clamping arm pivotally connected to said retaining arm and bodily movable laterally with respect to said retaining arm, said clamping arm having a jaw thereon adapted to engage a second flange on said retreader, a clamping screw carried by said clamping arm and adapted to lock said arms in fixed position when said screw is brought into engagement with an object contained in said retreader.

6. A retreader clamp comprising a retaining arm having a groove adapted to engage a flange of a retreader to permit longitudinal but not lateral movement of said retaining arm on said retreader, a clamping arm having a jaw adapted to engage a second flange on said retreader, a pivot pin on one of said arms, the other of said arms having an elongated aperture through which said pivot pin passes, whereby said clamping arm has bodily movement with respect to said retaining arm, and a clamping screw carried by said clamping arm and adapted to lock said arms in fixed position on said retreader when said clamping screw is brought into engagement with an object contained in said retreader.

7. A retreader clamp comprising a retaining arm having therein a groove adapted to engage a flange of a retreader to permit longitudinal but not lateral movement of said retaining arm on said retreader, a clamping arm having a jaw adapted to engage a second flange on said retreader, a pivot pin carried by one of said arms, the other of said arms having an elongated L-shaped aperture through which said pivot pin passes, and a clamping screw carried by said clamping arm and adapted to lock said arms in fixed position in engagement with the flanges of said retreader when said clamping screw is brought into engagement with an object contained in said retreader.

8. A retreader clamp comprising a pair of arms pivotally connected, means on each of said arms for engaging a flange of a retreader, and a clamping screw carried by one of said arms and adapted to lock said arms in position when said clamping screw is brought into engagement with an object contained in said retreader.

Signed at Chicago, Illinois, this 25th day of August, 1919.

WALTER R. FONTAINE.